United States Patent
Shukla et al.

(10) Patent No.: US 11,275,664 B2
(45) Date of Patent: Mar. 15, 2022

(54) ENCODING AND DECODING TROUBLESHOOTING ACTIONS WITH MACHINE LEARNING TO PREDICT REPAIR SOLUTIONS

(71) Applicant: Dell Products L.P., Round Rock, TX (US)

(72) Inventors: Ravi Shukla, Bangalore (IN); Jeffrey Scott Vah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 483 days.

(21) Appl. No.: 16/522,217

(22) Filed: Jul. 25, 2019

(65) Prior Publication Data

US 2021/0026750 A1    Jan. 28, 2021

(51) Int. Cl.
| | |
|---|---|
| *G06F 11/30* | (2006.01) |
| *G06N 20/00* | (2019.01) |
| *G06F 11/36* | (2006.01) |
| *G06F 11/34* | (2006.01) |
| *G06F 11/263* | (2006.01) |
| *G06Q 10/00* | (2012.01) |

(52) U.S. Cl.
CPC ........ *G06F 11/3086* (2013.01); *G06F 11/263* (2013.01); *G06F 11/3476* (2013.01); *G06F 11/366* (2013.01); *G06N 20/00* (2019.01); *G06Q 10/20* (2013.01)

(58) Field of Classification Search
CPC ............. G06F 11/3086; G06F 11/3476; G06F 11/3006; G06N 3/0445; G06N 3/0454
See application file for complete search history.

(56) References Cited

U.S. PATENT DOCUMENTS

| | | | |
|---|---|---|---|
| 6,088,690 A | 7/2000 | Gounares et al. | |
| 10,191,479 B2 * | 1/2019 | Lim | G05B 19/4065 |

(Continued)

OTHER PUBLICATIONS

D. Neg, "Seq2Seq: The Clown Car of Deep Learning," https://medium.com/@devnag/seq2seq-the-clown-car-of-deep-learning-f88e1204dac3, Apr. 24, 2019, 6 pages.

(Continued)

*Primary Examiner* — Nadeem Iqbal
(74) *Attorney, Agent, or Firm* — Ryan, Mason & Lewis, LLP

(57) ABSTRACT

A method includes obtaining information regarding a given asset to be repaired, providing the information regarding the given asset to an encoder of a deep learning model, and receiving, from a decoder of the deep learning model, a recommendation for a troubleshooting action to be performed on the given asset. The method also includes performing the recommended troubleshooting action on the given asset, determining whether the recommended troubleshooting action results in a successful repair of the given asset and, responsive to determining that the recommended troubleshooting action does not result in a successful repair of the given asset, augmenting the information regarding the given asset based at least in part on an output vocabulary of the decoder corresponding to the recommended troubleshooting action. The method further includes repeating the providing, receiving, performing and determining steps utilizing the augmented information regarding the given asset.

20 Claims, 13 Drawing Sheets

(56) References Cited

U.S. PATENT DOCUMENTS

| | | |
|---|---|---|
| 10,949,814 B1 * | 3/2021 | Nelson .................. G06N 5/048 |
| 2006/0004680 A1 | 1/2006 | Robarts et al. |
| 2015/0271008 A1 * | 9/2015 | Jain .................... H04L 41/0672 |
| | | 714/57 |
| 2017/0212829 A1 | 7/2017 | Bales et al. |
| 2017/0286396 A1 | 10/2017 | Sandor et al. |

OTHER PUBLICATIONS

M. Wadhwa, "Seq2Seq Model in Machine Learning," https://www.geeksforgeeks.org/seq2seq-model-in-machine-learning/, Dec. 5, 2018, 3 pages.

P. Goyal, "What is the Difference Between LSTM, RNN and Sequence to Sequence?," https://www.quora.com/What-is-the-difference-between-LSTM-RNN-and-sequence-to-sequence, Nov. 7, 2017, 2 pages.

M. Ma'Amari, "NLP | Sequence to Sequence Networks| Part 2|Seq2seq Model (EncoderDecoder Model)," https://towardsdatascience.com/nlp-sequence-to-sequence-networks-part-2-seq2seq-model-encoderdecoder-model-6c22e29fd7e1, Nov. 5, 2018, 16 pages.

* cited by examiner

| Product Identifier | Product Description | Symptom Set | Error Description (Tier 1) | Error Description (Tier 2) | Error Condition | Action Taken | Result (Tier 1) | Result (Tier 2) | Success /Failure |
|---|---|---|---|---|---|---|---|---|---|
| 388200563 | PRECISION 7520 | 1 | POST | INTERMITTENT POST | NO LED/ BEEP CODE | MIN TO POST | COIN CELL BATTERY | COIN CELL BATTERY | 0 |
| 388200563 | PRECISION 7520 | 1 | POST | INTERMITTENT POST | NO LED/ BEEP CODE | MIN TO POST | HARD DRIVE | HARD DRIVE | 0 |
| 388200563 | PRECISION 7520 | 1 | POST | INTERMITTENT POST | NO LED/ BEEP CODE | MIN TO POST | LCD | LCD | 0 |
| 388200563 | PRECISION 7520 | 1 | POST | INTERMITTENT POST | NO LED/ BEEP CODE | MIN TO POST | MEMORY | MEMORY | 0 |
| 388200563 | PRECISION 7520 | 1 | POST | INTERMITTENT POST | NO LED/ BEEP CODE | MIN TO POST | WIRELESS CARD | WIRELESS CARD | 0 |
| 388200563 | PRECISION 7520 | 1 | POST | INTERMITTENT POST | NO LED/ BEEP CODE | REPLACED | COMMODITY | MOTHER- BOARD | 1 |

FIG. 8

ENCODING AND DECODING TROUBLESHOOTING ACTIONS WITH MACHINE LEARNING TO PREDICT REPAIR SOLUTIONS

FIELD

The field relates generally to information processing, and more particularly to detection and remediation of errors in enterprise systems.

BACKGROUND

An enterprise system may include various types of assets, such as desktops, laptops, tablets and other computing devices, which are used by members of the enterprise system. When such assets encounter errors, technicians are responsible for diagnosing and remedying encountered errors through a series of troubleshooting actions. As the number and type of assets in an enterprise system grows, it is increasingly difficult for technicians to efficiently resolve such errors.

SUMMARY

Illustrative embodiments of the present disclosure provide techniques for encoding and decoding troubleshooting actions with machine learning to predict repair solutions. Embodiments advantageously allow for more efficient troubleshooting and repair of assets in an enterprise system.

In one embodiment, a method comprises obtaining information regarding a given asset to be repaired, providing the information regarding the given asset to an encoder of a deep learning model, and receiving, from a decoder of the deep learning model, a recommendation for a troubleshooting action to be performed on the given asset. The method also comprises performing the recommended troubleshooting action on the given asset, determining whether the recommended troubleshooting action results in a successful repair of the given asset, and, responsive to determining that the recommended troubleshooting action does not result in a successful repair of the given asset, augmenting the information regarding the given asset based at least in part on an output vocabulary of the decoder corresponding to the recommended troubleshooting action. The method further comprises repeating the providing, receiving, performing and determining steps utilizing the augmented information regarding the given asset. The method is performed by at least one processing device comprising a processor coupled to a memory.

The information regarding the given asset to be repaired may comprise one or more symptom sets and result information regarding the success or failure of one or more diagnostic and repair actions previously performed on the given asset. A given one of the one or more symptom sets may comprise an identifier of the given asset, a description of the given asset, and a description of at least one error encountered on the given asset.

Augmenting the information regarding the given asset based at least in part on the output vocabulary of the decoder corresponding to the recommended troubleshooting action may comprise adding a negation of the output vocabulary of the decoder corresponding to the recommended troubleshooting action to the information regarding the given asset that is provided to the encoder of the deep learning model in a subsequent iteration of the providing step.

These and other illustrative embodiments include, without limitation, methods, apparatus, networks, systems and processor-readable storage media.

BRIEF DESCRIPTION OF THE DRAWINGS

FIG. 8 depicts another example of system repair logs in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
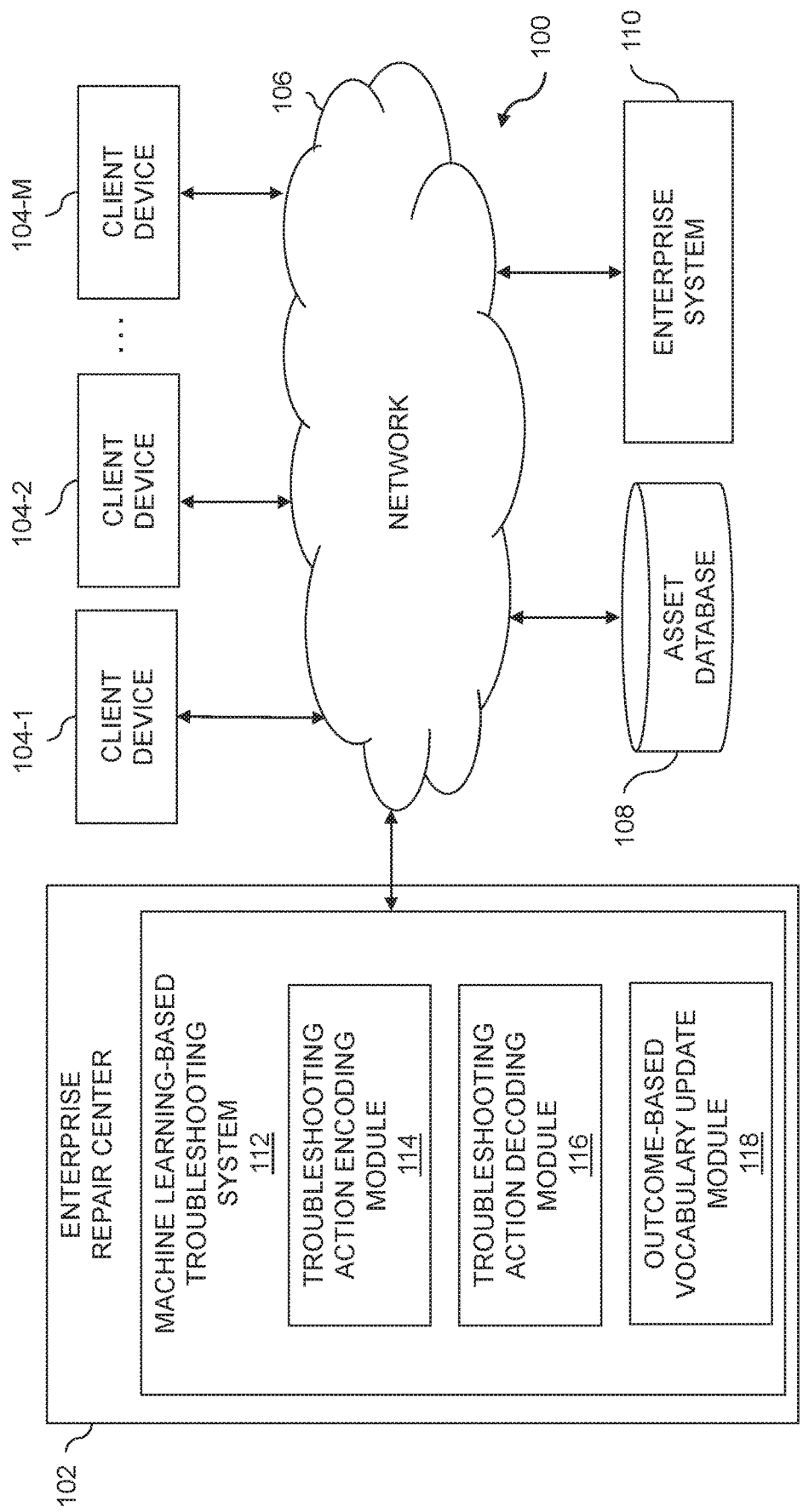
FIG. 1 is a block diagram of an information processing system for encoding and decoding troubleshooting actions with machine learning to predict repair solutions in an enterprise system in an illustrative embodiment.

FIG. 1 shows an information processing system 100 configured in accordance with an illustrative embodiment. The information processing system 100 is assumed to be built on at least one processing platform and provides functionality for encoding and decoding troubleshooting actions with machine learning to predict repair solutions for assets of an enterprise system 110 that encounter errors. The assets may include, by way of example, physical and virtual computing resources in the enterprise system 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In this embodiment, the system 100 more particularly comprises an enterprise repair center 102 and a plurality of client devices 104-1, 104-2, . . . 104-M (collectively, client devices 104). The client devices 104 are coupled to a network 106. Also coupled to the network 106 is an asset database 108, which may store various information relating to assets in the enterprise system 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. Thus, the client devices 104 may be considered examples of assets of the enterprise system 110. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The asset database 108, as discussed above, is configured to store and record information relating to assets in or associated with the enterprise system 110. Such assets, as noted above, may include the client devices 104 themselves. The information relating to the assets of the enterprise system 110 may include information such as past errors encountered on the assets and troubleshooting actions used to resolve such encountered errors. Each error or problem, as described in further detail below, may include symptom sets as well as a set of diagnostic, repair and other troubleshooting actions taken in attempt to resolve the encountered symptom sets.

The asset database 108 in some embodiments is implemented using one or more storage systems or devices associated with the enterprise repair center 102. In some embodiments, one or more of the storage systems utilized to implement the asset database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise repair center 102, as well as to support communication between the enterprise repair center 102 and other related systems and devices not explicitly shown. The client devices 104 are configured to access or otherwise utilize an enterprise system 110. The enterprise system 110 may represent an information technology (IT) infrastructure comprising a plurality of assets (e.g., physical or virtual computing resources) of a business, entity or other enterprise.

In some embodiments, the client devices 104 are assumed to be associated with repair technicians, system administrators, IT managers or other authorized personnel configured to access and utilize the machine learning-based troubleshooting system 112 of the enterprise repair center 102 to troubleshoot errors encountered by assets of the enterprise system 110. For example, a given one of the client devices 104 may be operated by a mobile technician that travels to a physical location of an asset to be repaired in the enterprise system 110 (e.g., an office, a data center, etc. of the enterprise system 110). The given client device 104 may be used by the repair technician to access a graphical user interface (GUI) provided by the machine learning-based troubleshooting system 112 to input symptom sets and other information regarding the asset to be repaired, and to receive recommendations for troubleshooting actions to be performed on the asset to be repaired. It should be noted that "repair" should be construed broadly, and includes various types of actions taken to remedy a particular error or other symptoms encountered on an asset. The repair may include changing settings of the assets, modifying (e.g., removing, installing, upgrading, etc.) software on the asset, modifying (e.g., removing, installing, replacing, etc.) hardware on the asset, etc.

The machine learning-based troubleshooting system 112 may be provided as a cloud service accessible by the given client device 104 to allow the technician to perform troubleshooting on-site. Alternatively, assets of the enterprise system 110 to be repaired may be provided to a repair depot or other physical site, where technicians utilizing the client devices 104 can perform troubleshooting of the assets using the machine learning-based troubleshooting system 112 of the enterprise repair center 102.

In some embodiments, the client devices 104 may implement host agents that are configured for automated transmission of information regarding assets to be repaired to the machine learning-based troubleshooting system 112, and to automatically receive recommendations for troubleshooting actions to be performed on the assets to be repaired. In some cases, the troubleshooting actions to be performed may be fully automated, such as by initiating certain diagnostic tests, software component modifications, etc. In other cases, the troubleshooting actions to be performed may require manual input, such as in replacing hardware components of an asset to be repaired. It should be noted, however, that even actions such as replacing the hardware components may be automated through the use of robotics at the enterprise repair center 102 if desired.

It should be noted that a "host agent" as this term is generally used herein may comprise an automated entity, such as a software entity running on a processing device. Accordingly, a security agent or host agent need not be a human entity.

As shown in FIG. 1, the enterprise repair center 102 comprises the machine learning-based troubleshooting system 112. As will be described in further detail below, the machine learning-based troubleshooting system 112 is configured to encode and decode troubleshooting actions using machine learning to predict repair solutions for assets in the enterprise system 110.

Although shown as an element of the enterprise repair center 102 in this embodiment, the machine learning-based troubleshooting system 112 in other embodiments can be implemented at least in part externally to the enterprise repair center 102, for example, as a stand-alone server, set of servers or other type of system coupled to the network 106. In some embodiments, the machine learning-based troubleshooting system 112 may be implemented at least in part within one or more of the client devices 104.

The machine learning-based troubleshooting system 112 in the FIG. 1 embodiment is assumed to be implemented using at least one processing device. Each such processing device generally comprises at least one processor and an associated memory, and implements one or more functional modules for controlling certain features of machine learning-based troubleshooting system 112. In the FIG. 1 embodiment, the machine learning-based troubleshooting system 112 comprises a troubleshooting action encoding module 114, a troubleshooting action decoding module 116 and an outcome-based vocabulary update module 118.

The troubleshooting action encoding module 114 is configured to obtain information regarding a given asset to be repaired, and to provide the information regarding the given asset to an encoder of a deep learning model. As will be described in further detail below, the information regarding the asset may include an asset identifier, a symptom set (e.g., error descriptions and conditions for errors encountered by the asset), result information for previous troubleshooting actions performed on the asset, etc. Such information may be provided to the encoder of the deep learning model using character-level or word-level embeddings, such that the series of steps of troubleshooting actions are treated as "conversations" by the deep learning model.

The troubleshooting action decoding module 116 is configured to receive, from a decoder of the deep learning model, a recommendation for a troubleshooting action to be performed on the given asset. The machine learning-based troubleshooting system 112 may then perform the recommended troubleshooting action on the given asset. As noted above, in some cases performing the recommended troubleshooting action on the given asset may be fully automated (e.g., running a software diagnostics test, modifying software components, etc.). In other cases, performing the recommended troubleshooting action on the given asset may be partially automated (e.g., certain repair actions such as replacing hardware components, etc.). In such cases, it should be understood that "performing" the recommended troubleshooting action includes initiating performance of the recommended troubleshooting action (e.g., by a technician with physical access to the given asset). Thus, it should be appreciated that "performing" the recommended troubleshooting action may in some embodiments include actions taken by technicians utilizing the client devices 104 to interact with the machine learning-based troubleshooting system 112.

The outcome-based vocabulary update module 118 is configured to determine whether the recommended troubleshooting action results in a successful repair of the given asset. If so, no further action is needed. If, however, it is determined that the recommended troubleshooting action does not result in a successful repair of the given asset, the outcome-based vocabulary update module 118 is configured to augment the information regarding the given asset based at least in part on an output vocabulary of the decoder corresponding to the recommended troubleshooting action. This may include, for example, adding a negation of the recommended troubleshooting action vocabulary to the input provided to the encoder of the deep learning model when seeking a subsequent recommendation for a troubleshooting action for the given asset. The machine learning-based troubleshooting system 112 may then utilize modules 114, 116 and 118 to repeat the above processing utilizing the augmented information regarding the given asset, either until the given asset is successfully repaired or a designated stop condition is reached (e.g., a threshold number of iterations of requesting recommended troubleshooting actions).

It is to be appreciated that the particular arrangement of the enterprise repair center 102, machine learning-based troubleshooting system 112, troubleshooting action encoding module 114, troubleshooting action decoding module 116 and outcome-based vocabulary update module 118 illustrated in the FIG. 1 embodiment is presented by way of example only, and alternative arrangements can be used in other embodiments. As discussed above, for example, the enterprise repair center 102, the machine learning-based troubleshooting system 112, the troubleshooting action encoding module 114, the troubleshooting action decoding module 116 and the outcome-based vocabulary update module 118 may in some embodiments be implemented internal to one or more of the client devices 104. As another example, the functionality associated with the troubleshooting action encoding module 114, the troubleshooting action decoding module 116 and the outcome-based vocabulary update module 118 may be combined into one module, or separated across more than three modules with the multiple modules possibly being implemented with multiple distinct processors or processing devices.

At least portions of the troubleshooting action encoding module 114, the troubleshooting action decoding module 116 and the outcome-based vocabulary update module 118 may be implemented at least in part in the form of software that is stored in memory and executed by a processor.

It is to be understood that the particular set of elements shown in FIG. 1 for encoding and decoding troubleshooting actions with machine learning to predict repair solutions for assets in the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the machine learning-based troubleshooting system 112 may be implemented external to enterprise repair center 102, such that the enterprise repair center 102 can be eliminated.

The machine learning-based troubleshooting system 112 and other portions of the system 100, as will be described in further detail below, may be part of cloud infrastructure.

The machine learning-based troubleshooting system 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and machine learning-based troubleshooting system 112 or components thereof (e.g., the troubleshooting action encoding module 114, the troubleshooting action decoding module 116 and the outcome-based vocabulary update module 118) may be implemented on respective distinct processing platforms, although numerous other arrangements are possible. For example, in some embodiments at least portions of the machine learning-based troubleshooting system 112 and one or more of the client devices 104 are implemented on the same processing platform. A given client device (e.g., 104-1) can therefore be implemented at least in part within at least one processing platform that implements at least a portion of the machine learning-based troubleshooting system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, machine learning-based troubleshooting system 112 or portions or components thereof, to reside in different data centers. Numerous other distributed implementations are possible. The machine learning-based troubleshooting system 112 can also be implemented in a distributed manner across multiple data centers.

Additional examples of processing platforms utilized to implement the machine learning-based troubleshooting system 112 in illustrative embodiments will be described in more detail below in conjunction with FIGS. 10 and 11.

It is to be appreciated that these and other features of illustrative embodiments are presented by way of example only, and should not be construed as limiting in any way.

Figure 2:
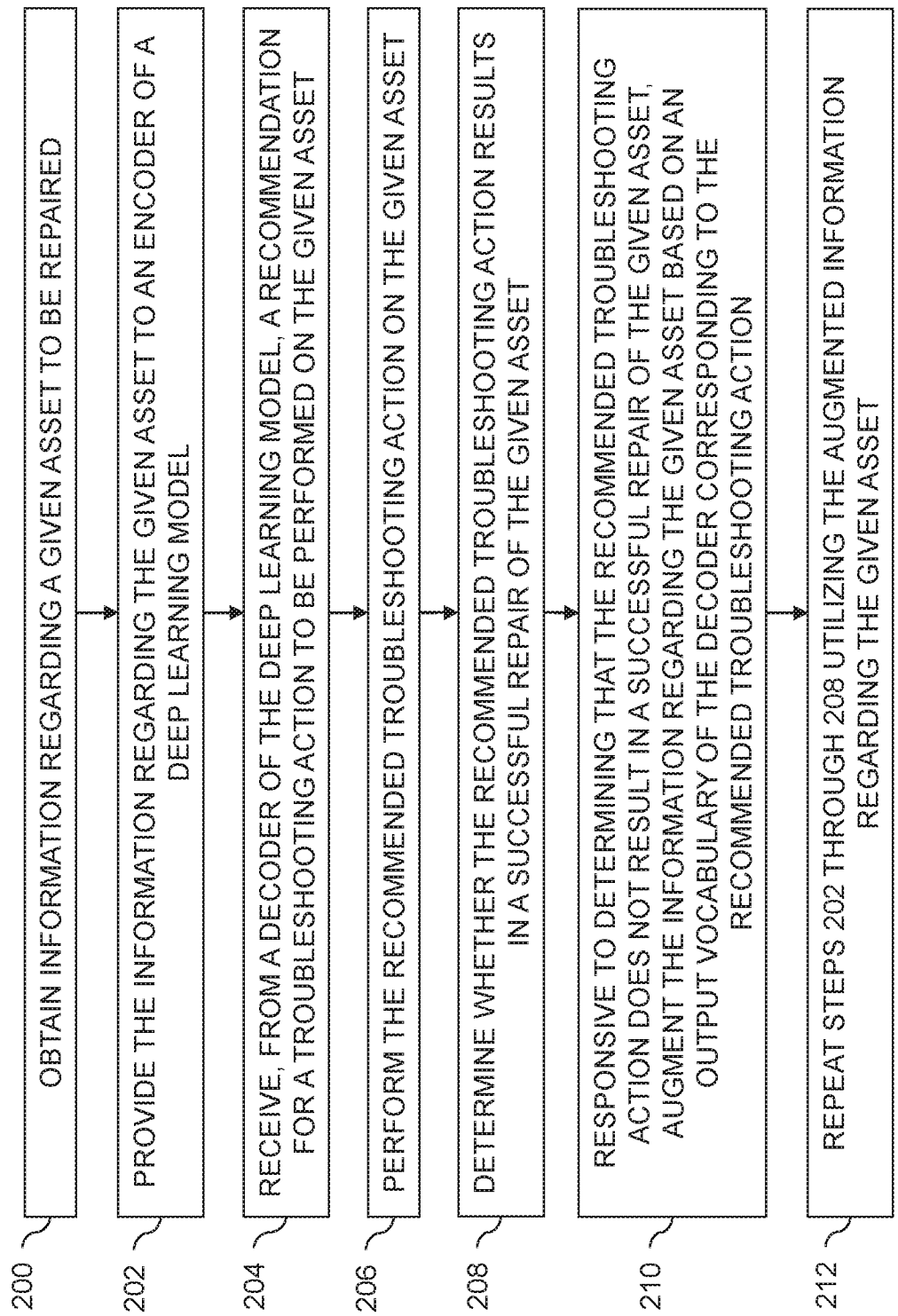
FIG. 2 is a flow diagram of an exemplary process for encoding and decoding troubleshooting actions with machine learning to predict repair solutions in an illustrative embodiment.

An exemplary process for encoding and decoding troubleshooting actions with machine learning to predict repair solutions will now be described in more detail with reference to the flow diagram of FIG. 2. It is to be understood that this particular process is only an example, and that additional or alternative processes for encoding and decoding troubleshooting actions with machine learning to predict repair solutions in other embodiments.

In this embodiment, the process includes steps 200 through 212. These steps are assumed to be performed by the machine learning-based troubleshooting system 112 utilizing the troubleshooting action encoding module 114, the troubleshooting action decoding module 116 and the outcome-based vocabulary update module 118. The process begins with step 200, obtaining information regarding a given asset to be repaired. The information regarding the given asset to be repaired may comprise one or more symptom sets, a given one of the one or more symptom sets comprising an identifier of the given asset, a description of the given asset, and a description of at least one error encountered on the given asset. The information regarding the given asset to be repaired may further comprise result information regarding the success or failure of one or more troubleshooting actions previously performed on the given asset. In some cases, the information regarding the given asset comprises two or more symptom sets. In such cases, the steps 202-212 may be run iteratively for each of the two or more symptom sets by utilizing information corresponding to a single one of the two or more symptom sets in each iteration of the steps 202-212.

In step 202, the information regarding the given asset is provided to an encoder of a deep learning model. A recommendation for a troubleshooting action to be performed on the given asset is received from a decoder of the deep learning model in step 204. The recommended troubleshooting action may comprise a diagnostic action or a repair action. Where the given asset comprises a computing device, the repair action may comprise modifying one or more software or hardware components of the computing device. The deep learning model may be trained utilizing information from one or more repair log entries for the given asset, historical repair logs for a plurality of other assets, and one or more technical support forums.

In step 206, the recommended troubleshooting action is performed on the given asset. As described above, performing the recommended troubleshooting action may be an automated action, such as initiating software tests or modifications to software components of the given asset. Certain troubleshooting actions, such as modifying hardware components of the given asset, may be partially automated. Such partial automation may include sending an alert or notification to a host agent running on a client device operated by a technician to perform the hardware component modification. The alert or notification may include various information, such as a series of steps for disassembling/reassembling the given asset to access and perform the necessary hardware modification. It should also be appreciated that certain types of diagnostic troubleshooting actions (e.g., rebooting a given asset that does not support remote or network-initiated reboot, etc.) may only be partially automated and may similarly be performed via sending an alert or notification to a host agent running on a client device operated by a technician to perform the diagnostic troubleshooting action. "Performing" the recommended troubleshooting action is to be construed broadly to include such partial automation.

In step 208, a determination is made as to whether the recommended troubleshooting action results in a successful repair of the given asset. If the recommended troubleshooting action is successful, the FIG. 2 process flow may end and information is recorded accordingly regarding the given asset. However, if the recommended troubleshooting action does not result in a successful repair of the given asset, the FIG. 2 process flow in step 210 will continue and augment the information regarding the given asset based at least in part on an output vocabulary of the decoder corresponding to the recommended troubleshooting action. The augmentation process may including adding a negation of the output vocabulary of the decoder corresponding to the recommended troubleshooting action to the information regarding the given asset that is then provided to the encoder of the deep learning model in a subsequent iteration of the providing step 202. In step 212, steps 202-208 of the FIG. 2 processing flow are repeated utilizing the augment information regarding the given asset.

The deep learning model may comprise a sequence-to-sequence machine learning model. Providing the information regarding the given asset to the encoder of the deep learning model in step 202 may comprise performing character-level input of the information regarding the given asset. In such cases, step 210 may include modifying the character-level input of the information regarding the given asset to add a set of characters comprising a negation of the output vocabulary of the decoder corresponding to the recommended troubleshooting action. Providing the information regarding the given asset to the encoder of the deep learning model in step 202 may alternatively comprise performing word-level input of the information regarding the given asset. In such cases, step 210 may comprise modifying the word-level input of the information regarding the given asset to comprise negations of words in the output vocabulary of the decoder corresponding to the recommended troubleshooting action.

Current repair and troubleshooting solutions face a number of challenges, including in the ability to accurately capture troubleshooting actions that are employed by repair technicians in determining failure of assets in an enterprise system (e.g., computer failures). Product repair and troubleshooting information logs entered by repair technicians (e.g., at an enterprise repair center) may be inconsistent in capturing all troubleshooting actions performed as the technicians work toward system failure resolution. Some technicians may provide whole solutions, while others do not. This inconsistency causes machine learning models that are deployed to assist in capturing troubleshooting actions to have sub-optimal prediction outcomes due to incorrectly recorded or missed actions within system repair logs that the machine learning model uses to make predictions. Without a complete record of all actions taken, the machine learning model is limited in its ability to accurately recommend relevant troubleshooting actions that a technician should perform to reach failure resolution.

To overcome these and other challenges, some embodiments utilize a deep learning conversational model that provides the ability to improve accuracy and relevancy of recommended troubleshooting actions (e.g., diagnostic and repair actions). Some embodiments do so by treating troubleshooting steps as "conversations" with symptom and product platform information, diagnostic information, repair actions and other relevant information as words used in the "conversations." Outcomes of troubleshooting actions provide a context using the conversation words, which are modified and fed to a sequence-to-sequence deep learning model for predicting a next set of troubleshooting actions.

Advantageously, the deep learning conversational model used in some embodiments is standalone and can be applied across a wide variety of different types of enterprise systems for the accurate prediction of troubleshooting actions (e.g., for diagnosis and repair of assets in an enterprise system). The deep learning conversational model may also be used to enhance other deployed solutions. In some embodiments, the deep learning conversational model uses cloud-based data to analyze onboard telemetric data, global repair insights, customer facing symptoms and complaints, etc., to recommend a most probable troubleshooting action. The deep learning conversational model may be used for predicting troubleshooting actions for a wide variety of different types of assets deployed in an enterprise system, including personal computers (PCs), all-in-one (AIO) computers, desktops, notebooks, tablets, etc.

Product repair and troubleshooting information may be captured at various enterprise systems (e.g., repair centers, including third-party repair centers) based at least in part on a generic "computer repair language" that is used across the computer repair industry. A system repair process may involve logging the steps or troubleshooting actions involved in fixing or repairing an asset. The repair log entry may include both expert and non-expert troubleshooting data, obtained in the form of standardized drop-downs or other user interface features for selecting information such as symptoms, conditions, repair actions, diagnostic results, etc. The repair log entry may also include various information, including one or more of the above-described types of information, in the form of free text (e.g., notes by a repair technician).

Illustrative embodiments provide a number of advantages relative to conventional techniques. For example, some embodiments provide a solution that may be deployed or applied in a repair depot environment. The deep learning model in some embodiments, as noted above, treats the repair process as conversations, preserving the context of all steps involved in a repair scenario and suggesting next steps. This is possible by changing the words based at least in part on the outcomes of troubleshooting actions. Further, the outcome-based vocabulary change provides additional advantages relative to other sequence-to-sequence models.

Figure 3:
FIG. 3 depicts an example of system repair log entries in an illustrative embodiment.

FIG. 3 shows an example of a system repair log entries 300. The system repair log entries 300 include columns for a product identifier (also referred to as a dispatch identifier, used to identify a particular asset while in the repair center), a product description, a symptom set, tier 1 and tier 2 error descriptions, error condition, action taken, tier 1 and tier 2 results, and a field indicating success or failure of a troubleshooting action (e.g., repair of a failed asset). Tier 1 and tier 2 error conditions may be used to indicate symptoms and sub-symptoms of a particular product or other asset being repaired. For example, the tier 1 error description may provide a higher-level description of the error encountered (e.g., boot issue, damage, freezing) while the tier 2 error description provides additional detail regarding the error encountered (e.g., no boot, customer-induced damage, freezing on boot, etc.). The error condition provides additional detail regarding the errors encountered (e.g., basic input-output system (BIOS) settings related to boot, physical damage, freezing on loading an operating system (OS) or upon boot, etc.). The action taken field indicates the troubleshooting action or actions taken in attempt to remedy the errors encountered (e.g., updating the BIOS, replacing damaged parts, performing enhanced pre-boot system assessment (ePSA) or other diagnostic tests, etc.). The tier 1 result field provides a high-level description of the results of the troubleshooting action taken (e.g., BIOS change, the type of part replaced such as mechanical or commodity parts, pass or failure of ePSA, etc.) while the tier 2 result field provides additional detail (e.g., changing BIOS settings, replacing a particular part such as the bottom cover or motherboard, pass or failure of ePSA, etc.). The success or failure field indicates whether the troubleshooting actions were successful in diagnosing and/or repairing a failure (e.g., 1 denoting success, 0 denoting failure).

In some embodiments, as noted above, troubleshooting action or system repair steps are treated as "conversations" with symptom and product platform information, diagnostic information, repair actions and other relevant information as words used in the "conversations." The outcome of each troubleshooting action provides a context (e.g., success or failure), with the context being used to modify the conversation words that are fed to the deep learning conversational model for predicting a next set of recommended troubleshooting actions. It is assumed in some embodiments that recommended troubleshooting actions are dependent on factors such as the product platform, symptoms, conditions, etc.

When an expert human technician carries out a repair, the technician may follow a step-by-step procedure involving: (i) checking logically for the root cause of issues using diagnostic tests; (ii) attempting to fix using repair actions; and (iii) repeating (i) and (ii) until reaching a successful resolution of the problem encountered. The resolution may be one of many types, such as replacing or removing parts, updating software, etc. Unsuccessful diagnostic tests are important, and help in eliminating applying the wrong fix or repair action. A successful repair action or solution should predict all the relevant diagnostic tests for an issue, even though some of the diagnostic tests may be inconclusive. The solution should also learn from failures as well as success.

In some embodiments the deep learning conversational model uses a sequence-to-sequence type model instead of a single recurrent neural network (RNN) model. The sequence-to-sequence type deep learning model is selected as the length of input entries may not be the same as the output, and thus the sequence-to-sequence model is more appropriate than a single RNN model. The repair and troubleshooting process is treated as conversations.

Figure 4:
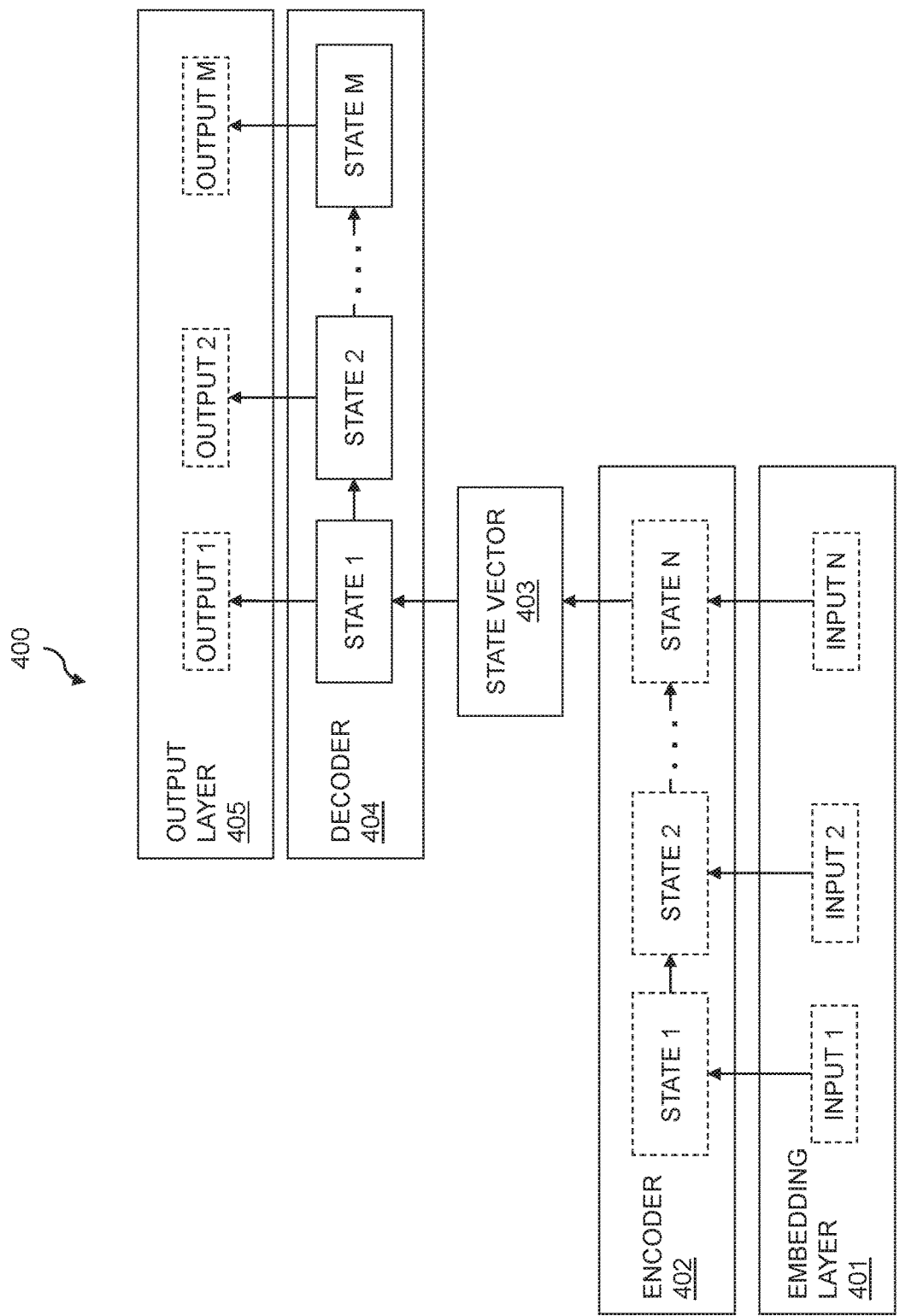
FIG. 4 depicts a sequence-to-sequence machine learning model in an illustrative embodiment.

FIG. 4 shows an example of a sequence-to-sequence model 400 used for predicting repair and troubleshooting actions. The model 400 can work with both character-level inputs and word-level inputs (e.g., by using word embedding). The model 400 includes an embedding layer 401, an encoder 402, a state vector 403, a decoder 404, and an output layer 405. Each of the encoder 402 and decoder 404 may be implemented as a RNN, including a particular type of RNN such as a Long Short Term Memory (LSTM) RNN, a Gated Recurrent Unit (GRU) RNN, etc. In some embodiments, the hyperparameters used for the RNN include 128 for the size of the hidden layers, 2 as the number of hidden layers, 128 for the embedded size representing the number of dimensions for word embedding, a learning rate of 0.001, a batch size of 32 and an epoch of 100. It should be appreciated, however, that various other hyperparameter values may be used in other embodiments. The choice of particular hyperparameter values for use in implementing the RNNs providing the encoder 402 and decoder 404 may depend on the available computing resources, available time for computation, etc.

Symptom tiers, conditions, product platform and other information are fed into the encoder 402 (e.g., as inputs 1 through N) via the embedding layer 401. The encoder 402 outputs a state (e.g., state N) to the state vector 403, which provides the input to the decoder 404. The decoder 404 predicts repair actions (e.g., as outputs 1 through M) via output layer 405, which may be implemented as a softmax output layer. Based at least in part on the outcome of each step in the repair process (e.g., 0 or 1 indicating failure or success, respectively), a decision is made as to whether the input "words" provided to the encoder 402 should be modified for the next step or iteration of the sequence-to-sequence model 400.

For new input, the decoder output of the last step (e.g., output M) is added to the last input (e.g., input N). This process is repeated until there is a successful repair, or until the repair process is stopped (e.g., after some designated threshold number of iterations of running the model 400, manual stop by a technician, etc.). The model 400 may be run for each "problem" encountered on a particular asset. If an asset (e.g., a computer system) has two problems, then the model 400 may be run twice, once for each symptom set (e.g., denoting each of the two problems). In case the outcome of the repair or diagnostic action is 1 (e.g., indicating success), then there is no change in the input words provided to the encoder 402 based at least in part on the output vocabulary of the decoder 404. If the outcome is 0 (e.g., indicating failure), then a negation of the output vocabulary of the decoder is appended or augmented to the input provided to the encoder in a next step or iteration. In some embodiments, adding the negation includes adding "not" to each output of the decoder 404. This indicates that the output of the previous step was a failure (e.g., replacing the output "replace commodity motherboard" of the decoder 404 with "replace_not commodity_not motherboard_not").

The deep learning conversational sequence-to-sequence model 400 may be trained using character-level or word-level input. For character-level input, the output of the model 400 is character by character. The model 400 may be trained on a dataset including repair log entries (e.g., such as those shown in FIG. 3), historical repair logs suitably transformed into a format fit for a sequence-to-sequence model, external sources (e.g., discussions on technical communities or support forums suitably transformed into a format fit for a sequence-to-sequence model), and for unsuccessful repair and diagnostic tests, a negation (e.g., the word "_not") is added to the troubleshooting actions or repair steps. For example, if the data says "replacing the motherboard did not help" this may be converted to "replace_not motherboard_not" for use with the model 400.

For word-level input, the output of the model 400 is word by word and in this case "word vectors" or "word embeddings" are created by training on the same information as noted above. Once the model is trained, it may be used by an enterprise system to generate recommended troubleshooting actions (e.g., diagnostic and repair actions).

Figure 5:
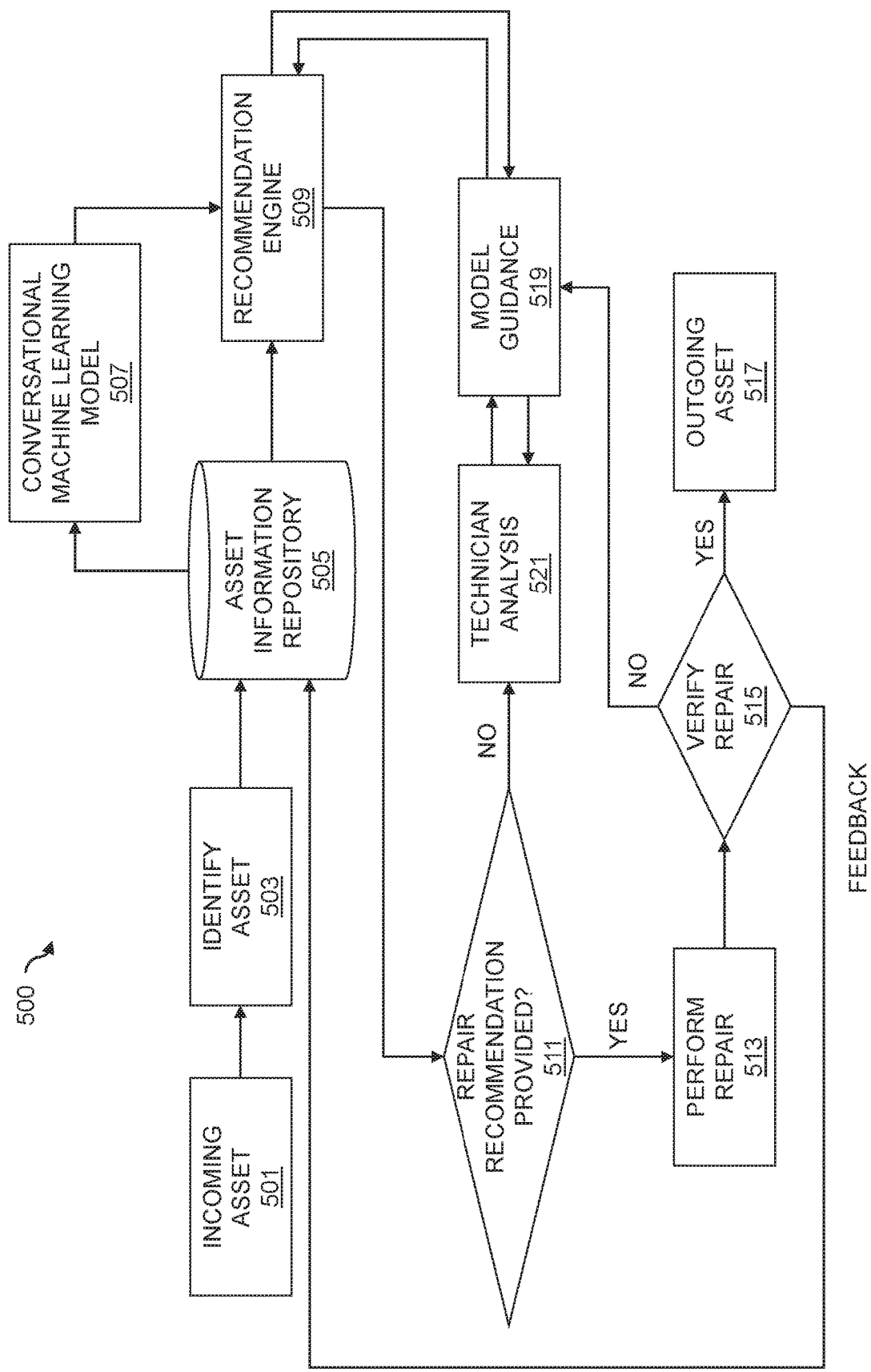
FIG. 5 depicts a processing flow for repairing assets in an illustrative embodiment.

FIG. 5 shows a process flow for handling troubleshooting and repair at a repair depot. In block 501, an incoming asset is received at the repair depot. The incoming asset may include, by way of example, a PC, AIO, desktop, laptop, tablet, etc. In block 503, the incoming asset is identified. This may involve, for example, locating a serial number or other identifier of the asset such as a service tag, and scanning or reading the identifier or service tag to identify the incoming asset. Once identified, an application programming interface (API) call is made to an asset information repository 505 with the identifier or service tag of the incoming asset. The asset information repository 505 may include a database (e.g., a structured query language (SQL) database) with information (e.g., service tag history, symptoms, latest diagnostics, etc.) for the incoming asset and assets similar to the incoming asset (e.g., other models of a computing system with the same or similar hardware and software components). Information from the asset information repository 505 is passed to the conversational machine learning model 507 for model training. The information from the asset information repository 505 may also be passed to the recommendation engine 509. The recommendation engine 509 uses a trained or deployed instance of the conversational machine learning model 507, along with information passed from the asset information repository 505, to provide troubleshooting action recommendations for the incoming asset.

In block 511, it is determined whether the recommendation engine 509 has provided a troubleshooting action recommendation for the incoming asset. If the result of block 511 is yes, the recommended troubleshooting action (e.g., a repair action) is performed in block 513 and verified in block 515. Performing the recommended troubleshooting action in block 513 may include, for example, removing and replacing hardware or software components of the incoming asset. Verifying the success or failure of the recommended troubleshooting action in block 515 may include scanning removed hardware or software components to verify failure of the removed components. After verifying the success or failure of the recommended troubleshooting action in block 515, feedback may be provided to the asset information repository 505 for further training of the conversational machine learning model 507 used by the recommendation engine 509 to provide troubleshooting action recommendations. The feedback may include data capture for recommendations and diagnostics.

If the repair is successfully verified in block 515, the incoming asset is determined to be fixed (e.g., after running quality checks and diagnostics) and the incoming asset is converted to an outgoing asset 517 that leaves the repair depot (e.g., the asset is returned to the customer or other end-user). If the repair is not successfully verified in block 515 (e.g., after running quality checks and diagnostics), the process flow 500 proceeds to block 519 for model guidance. The model guidance block 519 utilizes various API calls and responses to the recommendation engine 509, as well as interaction with technician analysis block 521 to provide a new troubleshooting action recommendation in block 511. The technician analysis block 521 and model guidance block 519 may also be invoked if no troubleshooting action recommendation is provided in block 511 during previous processing. The process flow 500 may iterate through until the repair is successfully verified in block 515, or until some other designated stop condition is reached (e.g., a threshold number of attempted troubleshooting actions in block 513, a threshold time or resources consumed in technician analysis block 521, etc.).

An asset repair process flow may be iterative with a number of processing steps where a repair technician provides symptoms to the recommendation engine 509, receives a troubleshooting action recommendation from the recommendation engine 509, and determines whether the troubleshooting action recommendation is successful or not. The success or failure of the troubleshooting action recommendation is used by the recommendation engine 509 to update the conversational machine learning model 507. Consider, as an example a repair flow where a technician provides symptoms such as power, battery and does not charge. The technician interacts with the recommendation engine 509 to obtain a first troubleshooting action recommendation, which is a diagnostic action of performing a full functional test of the battery. The technician may apply this troubleshooting action recommendation without success, and indicate as such via feedback to the recommendation engine 509, where the feedback is used to update the conversational machine learning model 507. The technician may then ask the recommendation engine 509 for a second troubleshooting action recommendation, which may be provided as the diagnostic action of performing ePSA or any other diagnostic action for battery charging trying a known good AC adapter. The technician attempts this troubleshooting action recommendation, and provides a diagnostic result to the recommendation engine 509 confirming failure with a full functional test indicating battery charging failure with a good AC adapter. This feedback is used by the recommendation engine 509 to further update the conversational machine learning model 507. The technician then asks the recommendation engine 509 for a third troubleshooting action recommendation, which is the recommended repair action of replacing the commodity motherboard of the asset. The technician applies this recommended repair action and verifies a successful repair. This may be contrasted with what would otherwise be the naïve result to encountering symptoms such as the battery not charging, which would be to replace the battery and/or AC adapter.

Figure 6:
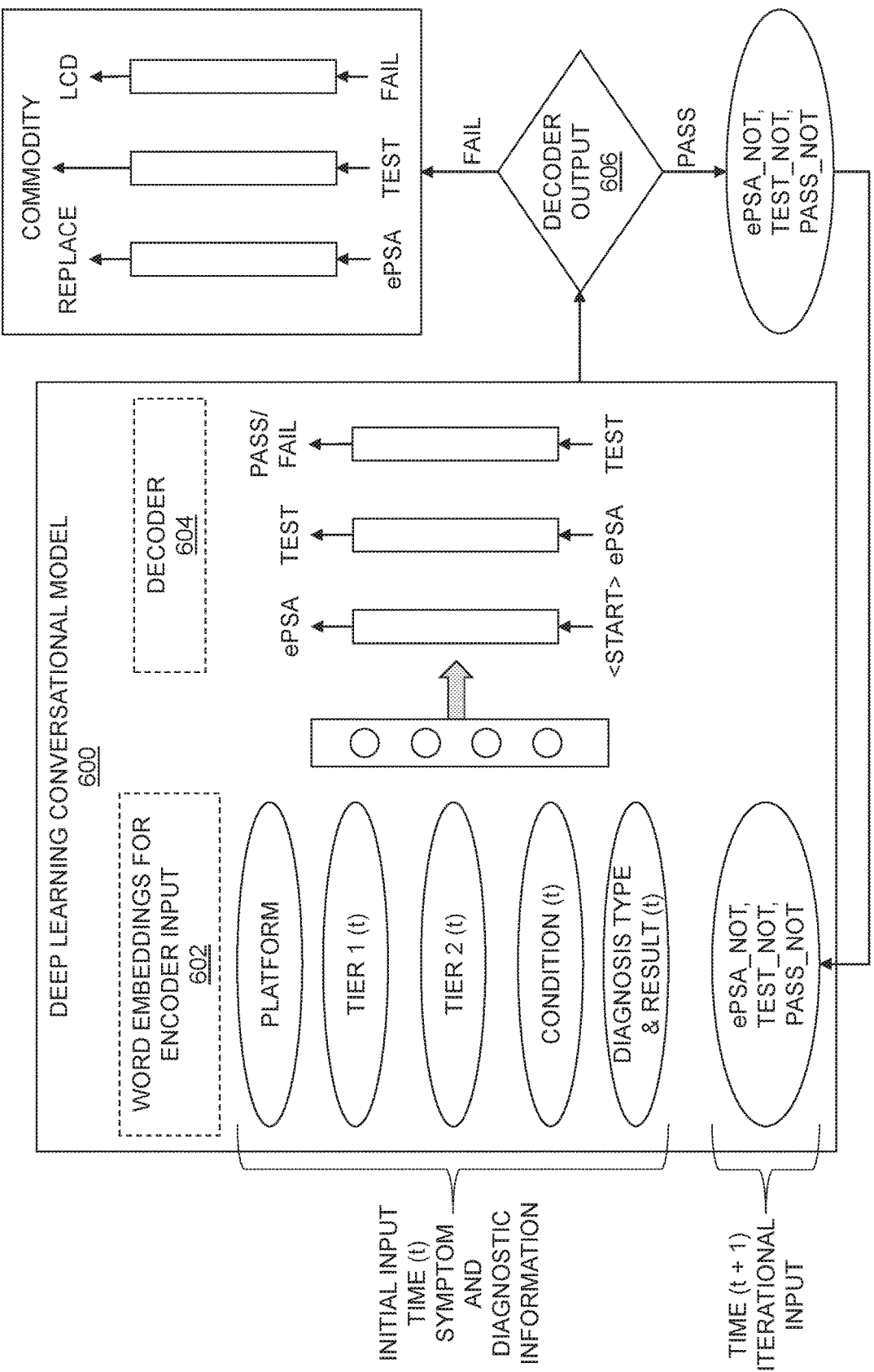
FIG. 6 depicts an implementation of a deep learning conversational model in an illustrative embodiment.

FIG. 6 shows an example implementation of a deep learning conversational model 600 for generating recommendations for troubleshooting actions for assets in an enterprise system. The deep learning conversational model 600 uses a sequence-to-sequence machine learning model and an outcome-based vocabulary. FIG. 6 shows word embeddings for input to an encoder 602 of the deep learning conversational model 600. The word embeddings are shown corresponding to the columns of the repair log entries 300 shown in FIG. 3, including initial input of a platform, tier 1 and tier 2 error descriptions, error condition, and diagnosis type and result (e.g., action taken, tier 1 and tier 2 results, success and failure fields, etc.). This initial input is taken at a time denoted t with various symptom and diagnostic information as described. The word embeddings also include iterational input at time (t+1) from the decoder 604, described in further detail below.

In the FIG. 6 example, it is assumed that the initial input includes tier 1 and tier 2 error descriptions of display and lines on display, respectively. The initial input may also include the condition of lines on display (e.g., a liquid crystal display (LCD)) after boot. Given this encoder 602 input, the decoder 604 generates a recommended troubleshooting action of performing a diagnostic action of ePSA test, which may have a decoder output 606 of ePSA test pass or ePSA test fail. If the decoder output 606 is "pass" this is provided as iterational input of "ePSA_not, test_not, pass_not" to the encoder 602 for a subsequent iteration to determine another recommended troubleshooting action (e.g., as the ePSA test did not find error). This feedback is important, as diagnostic tests that pass or do not identify problems may be used for generating subsequent recommendations. If the decoder output 606 is "fail" then this leads to the recommended repair action of "replace commodity LCD."

Figure 7A:
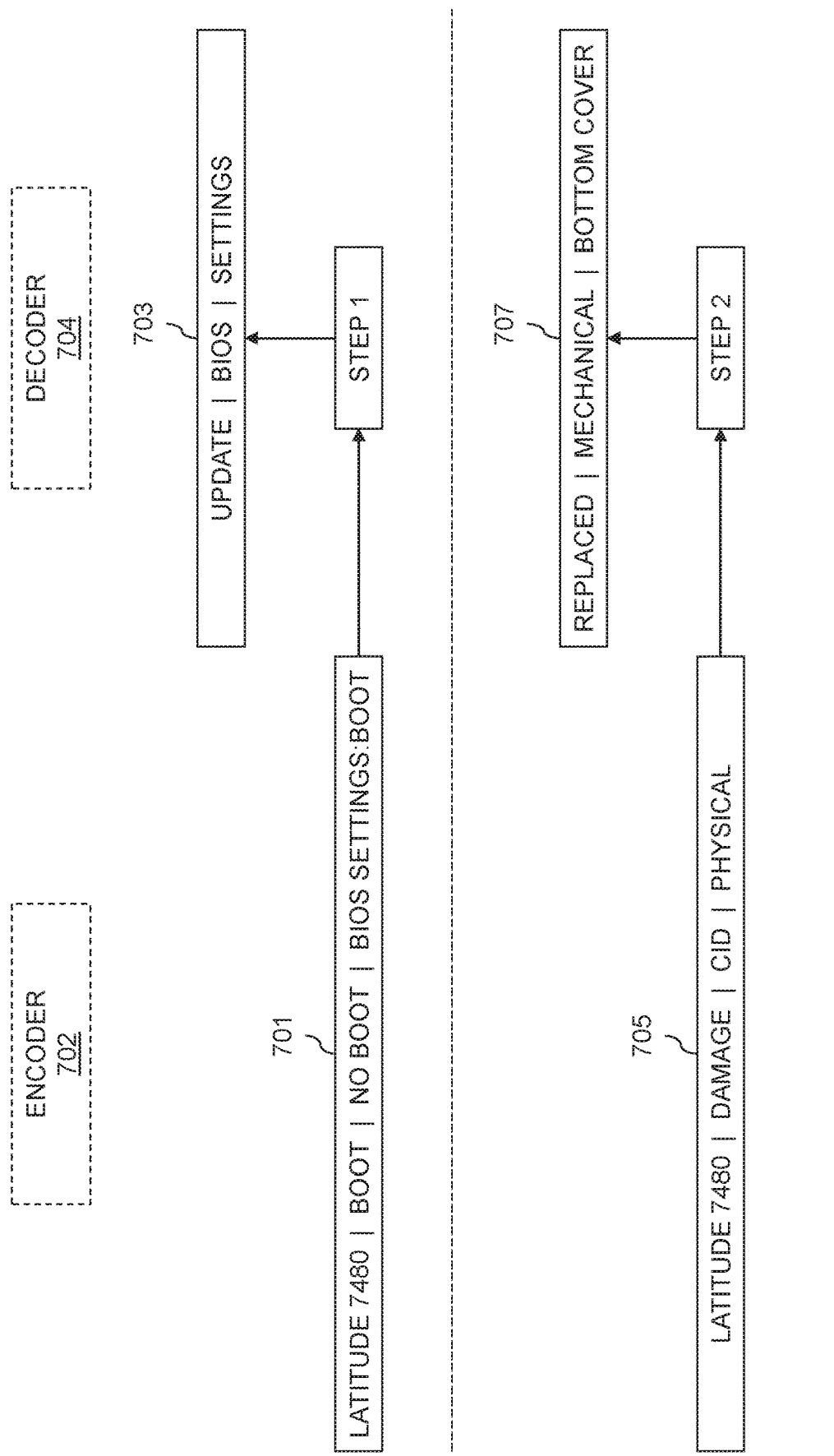
FIGS. 7A and 7B depict training of a deep learning conversational model utilizing the FIG. 3 repair logs in an illustrative embodiment.
Figure 7B:
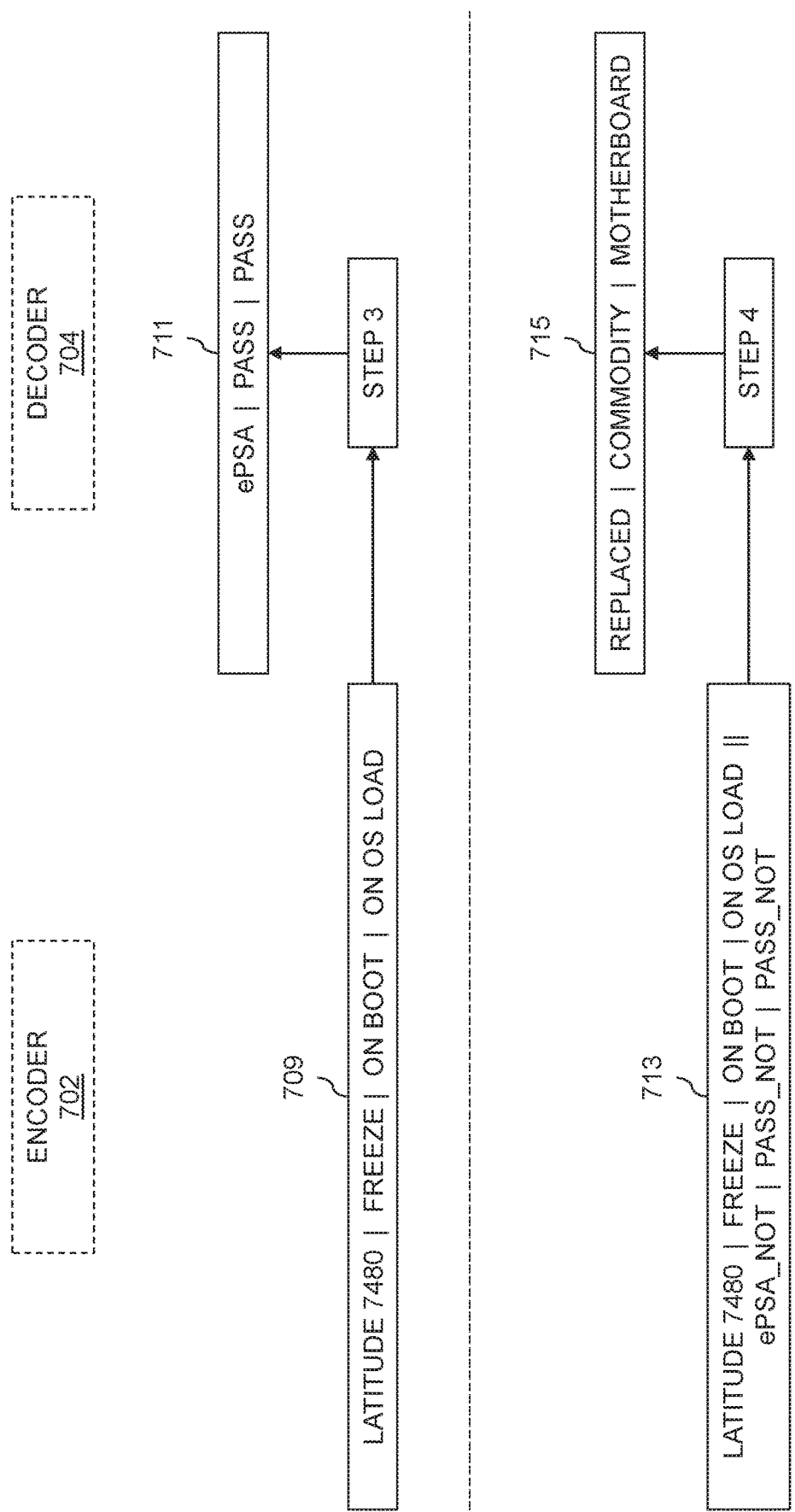

FIGS. 7A and 7B depict a flow for inputs to an encoder 702 and outputs of a decoder 704 during training of a conversational deep learning model using the system repair logs shown in FIG. 3. It should be noted that the FIG. 3 repair logs include three distinct symptom sets, which require three separate iterations of encoding-decoding with the deep conversational model to resolve each distinct symptom set. As the FIG. 3 repair logs indicate that the system has three different symptom sets, three interactive diagnostic and repair processes will be run using the deep learning conversational model to resolve each symptom set.

The interactive diagnostic and repair process illustrated in FIGS. 7A and 7B begins with the technician providing a first symptom set (e.g., to a graphical user interface (GUI), which may include drop-down menus or other interface features for inputting symptoms and conditions of a particular asset and for obtaining a troubleshooting action recommendation). In the first step or iteration, the input 701 to the encoder 702 is the first line of the FIG. 3 repair logs (omitting the dispatch identifier of the first column of the repair logs 300, which may be used for tracking a particular asset while diagnostics and repairs are performed in a repair center). Thus, the first input 701 to the encoder 702 is "Latitude 7480|Boot|No Boot|BIOS Settings: Boot" and the corresponding output 703 of the decoder 704 in step 1 is "Update BIOS Settings". As the decoder 704 output here successfully resolves the first symptom set (e.g., the success/failure column for the first row of repair logs 300 is "1"), the flow moves to the second symptom set in step 2.

The second input 705 to the encoder 702 is "Latitude 7480|Damage|CID|Physical" corresponding to the second row of the repair logs 300. In step 2, this results in output 707 of "Replaced|Mechanical|Bottom Cover" from the decoder 704. Again, this decoder 704 output resolves the second symptom set (e.g., the success/failure column for the second row of repair logs 300 is "1"), and the flow moves to the third symptom set in step 3.

The third input 709 to the encoder 702 is "Latitude 7480|Freeze|On Boot|On OS Load" corresponding to the third row of the repair logs 300. In step 3, this results in output 711 of "ePSA|Pass|Pass" from the decoder 704. In this instance, however, the decoder 704 output does not resolve the third symptom set (e.g., the success/failure column for the third row of repair logs 300 is "0"), and the flow moves to step 4 where the output vocabulary of step 3 is used to provide iterational input to the encoder 702. The iterational input 713 provided to the encoder 702 in step 4 appends the step 3 input with "ePSA_not|Pass_not|Pass_not". The output 715 of the decoder 704 in step 4 is "Replaced|Commodity|Motherboard" which successfully resolves the third symptom set (e.g., the success/failure column for the third row of repair logs 300 is "1"). The augmented iterational input used in step 4 allows the deep learning conversational model to provide a new troubleshooting action recommendation to resolve the third symptom set.

Figure 9A:
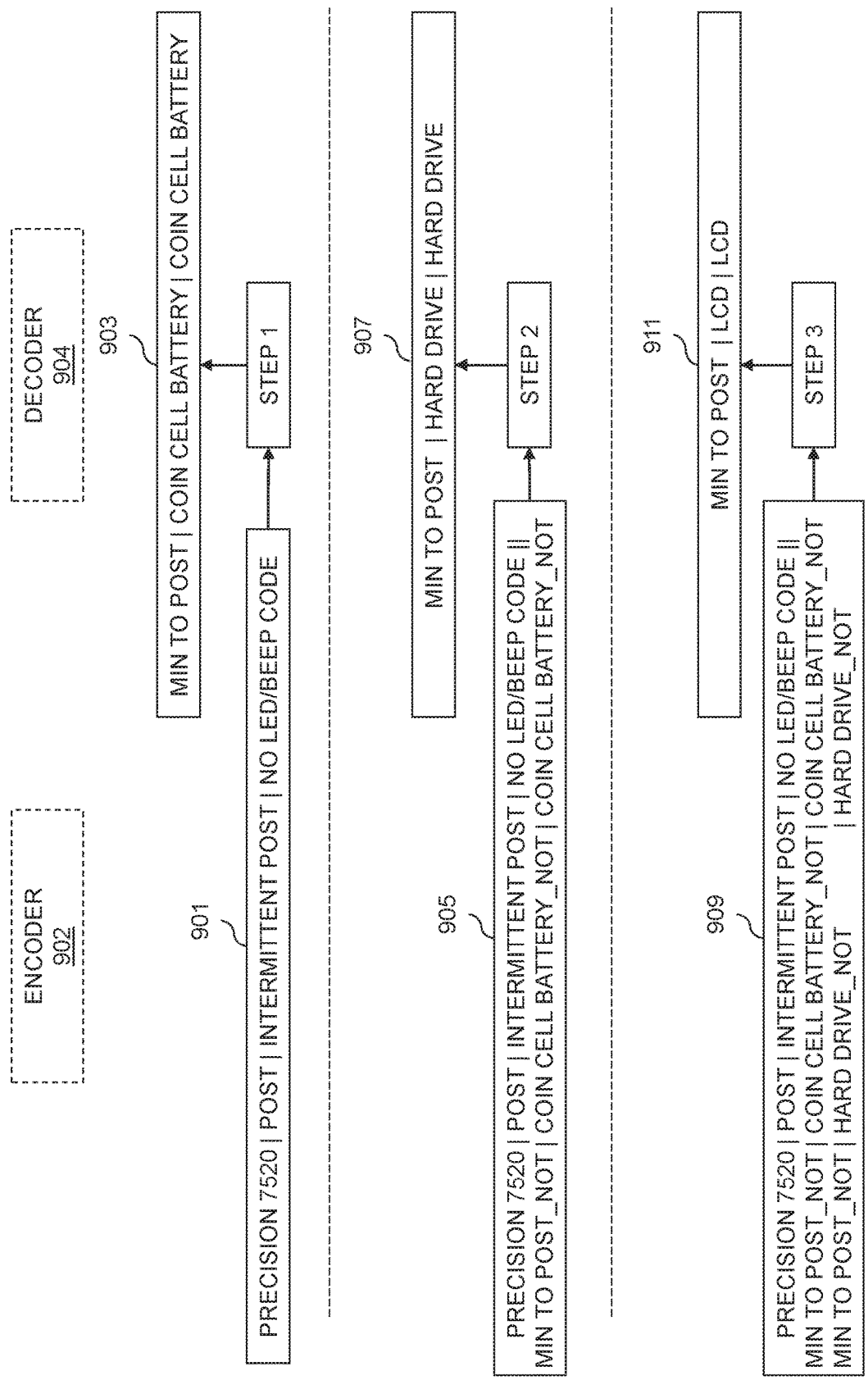
FIGS. 9A and 9B depict training of a deep learning conversational model utilizing the FIG. 8 repair logs in an illustrative embodiment.
Figure 9B:
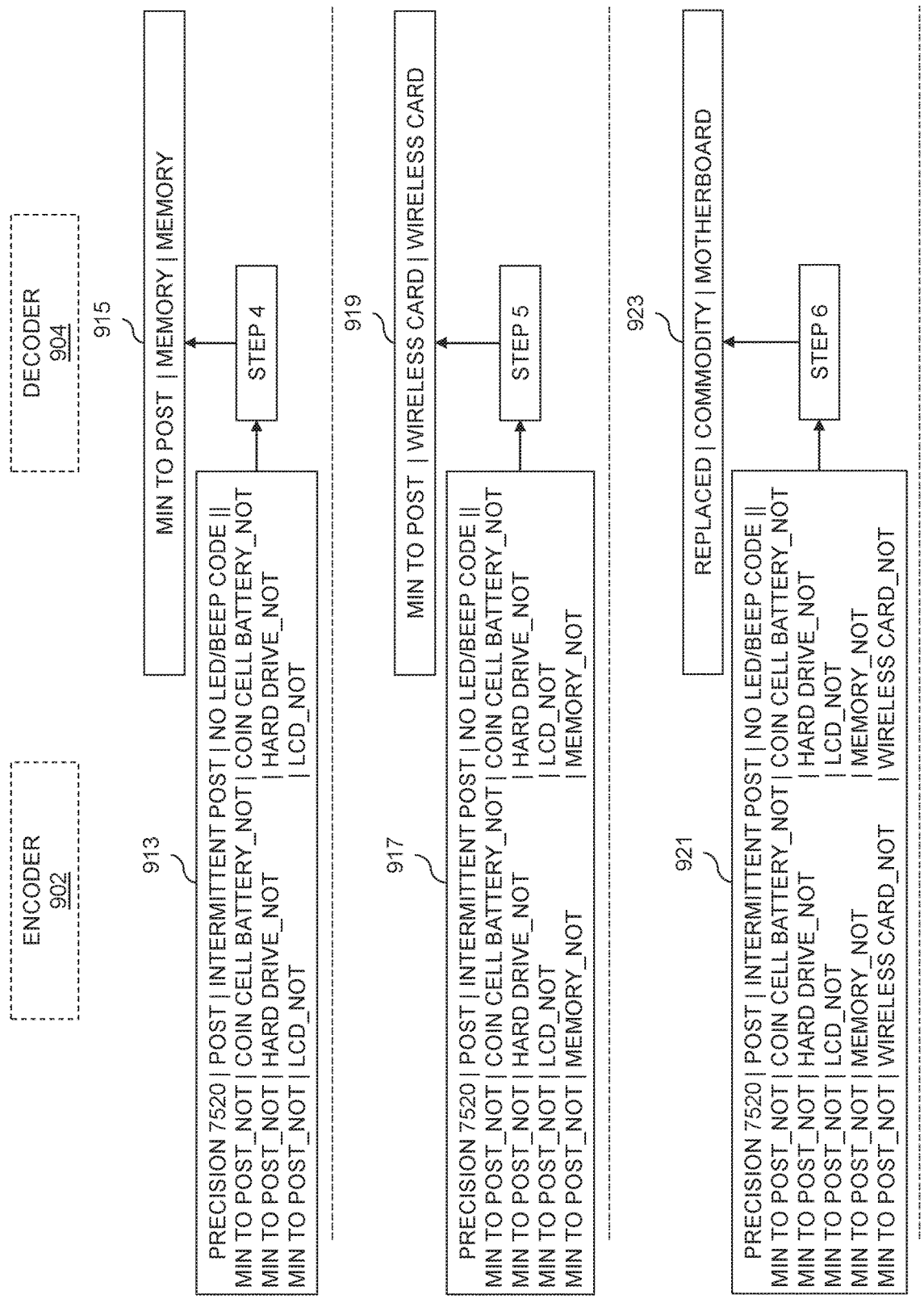

FIG. 8 shows another example of system repair logs 800. In the FIG. 8 example, as contrasted with the FIG. 3 example, there is just a single symptom set for the Precision 7520 product—a tier 1 error description of "POST" (for Power-On Self-Test) and a tier 2 error description of "Intermittent POST" with an error description of "No LED/Beep Code" in each row. The rows illustrate a set of steps for resolving this symptom set using iterational input from the output vocabulary of a decoder to refine the recommendations provided by the deep learning conversational model. FIGS. 9A and 9B illustrate training and use of a deep learning conversational model utilizing the system repair logs 800 of FIG. 8.

The interactive diagnostic and repair process illustrated in FIGS. 9A and 9B begins with the technician providing the symptom set, such as via a GUI as described above. In step 1, the encoder 902 input is the first line of the system repair logs 800 (again omitting the dispatch identifier of the first column that may be used for tracking a particular asset while diagnostics and repairs are performed in a repair center). Thus, the first input 901 to the encoder 902 is "Precision 7520|POST|Intermittent POST|No LED/Beep Code" and the output 903 of the decoder 904 in the first step or iteration is "Min to POST|Coin Cell Battery|Coin Cell Battery". "Min to POST" refers to minimum to POST, a concept in certain assets such as computer systems corresponding to the minimal set of hardware components that allows a particular asset to successfully complete the POST. This diagnostic and repair output 903 refers to removing the coin cell battery of the asset and determining if this is the component causing the intermittent POST symptom with no LED/beep code. As indicated in the first row of the system repair logs 800, the recommended troubleshooting action output 903 of step 1 is not successful at resolving the symptoms. The flow then moves to a second step or iteration, where the output vocabulary of step 1 is used to provide iterational input to the encoder 902.

In step 2, the input 905 to the encoder 902 appends the step 1 input with "Min to POST_not|Coin Cell Battery_not|Coin Cell Battery_not". The augmented input 905 in step 2 allows the deep learning conversational model to provide a new troubleshooting action recommendation to resolve the encountered symptoms. The output 907 of the decoder 902 in step 2 is the recommended troubleshooting action of "Min to POST|Hard Drive|Hard Drive" which involves removing the hard drive to determine if the hard drive is the component causing the intermittent POST with no LED/beep code. As indicated in the second row of the system repair logs 800, the recommended troubleshooting action output 907 of step 2 is not successful at resolving the symptoms. The flow then moves to a third step or iteration, where the output vocabulary of step 2 is used to provide additional iterational input to the encoder 902.

In step 3, the input 909 to the encoder 902 appends the step 2 input with "Min to POST_not|Hard Drive_not|Hard Drive_not". The augmented input 909 in step 3 allows the deep learning conversational model to provide a new troubleshooting action recommendation to resolve the encountered symptoms. The output 911 of the decoder 902 in step 3 is the diagnostic and repair step of "Min to POST|LCD|LCD" which involves removing the LCD to determine if the LCD is the component causing the intermittent POST with no LED/beep code. As indicated in the third row of the system repair logs 800, the recommended troubleshooting action output 911 of step 3 is not successful at resolving the symptoms. The flow then moves to a fourth step or iteration, where the output vocabulary of step 3 is used to provide additional iterational input to the encoder 902.

In step 4, the input 913 to the encoder 902 appends the step 3 input with "Min to POST_not|LCD_not|LCD_not". The augmented input 913 in step 4 allows the deep learning conversational model to provide a new troubleshooting action recommendation to resolve the encountered symptoms. The output 915 of the decoder 902 in step 4 is the diagnostic and repair step of "Min to POST|Memory|Memory" which involves removing the memory to determine if the memory is the component causing the intermittent POST with no LED/beep code. As indicated in the fourth row of the system repair logs 800, the recommended troubleshooting action output 915 of step 4 is not successful at resolving the symptoms. The flow then moves to a fifth step or iteration, where the output vocabulary of step 4 is used to provide additional iterational input to the encoder 902.

In step 5, the input 917 to the encoder 902 appends the step 4 input with "Min to POST_not|Memory_not|Memory_not". The augmented input 917 in step 5 allows the deep learning conversational model to provide a new troubleshooting action recommendation to resolve the encountered symptoms. The output 919 of the decoder 902 in step 5 is the diagnostic and repair step of "Min to POST|Wireless Card|Wireless Card" which involves removing the wireless card to determine if the wireless card is the component causing the intermittent POST with no LED/beep code. As indicated in the fifth row of the system repair logs 800, the recommended troubleshooting action output 919 of step 5 is not successful at resolving the symptoms. The flow then moves to a sixth step or iteration, where the output vocabulary of step 5 is used to provide additional iterational input to the encoder 902.

In step 6, the input 921 to the encoder 902 appends the step 5 input with "Min to POST_not|Wireless Card_not|Wireless Card_not". The augmented input 921 in step 6 allows the deep learning conversational model to provide a new troubleshooting action recommendation to resolve the encountered symptoms. The output 923 of the decoder 902 in step 6 is the diagnostic and repair step of "Replaced|Commodity|Motherboard" which involves replacing the motherboard of the affected asset. As indicated in the sixth row of the system repair logs 800, the recommended troubleshooting action output 923 of step 6 is successful at resolving the symptoms, and the flow is concluded.

It should be appreciated that the particular symptom sets and recommended troubleshooting actions (e.g., diagnostic and repair steps) described above in conjunction with FIGS. 3, 7A, 7B, 8, 9A and 9B are presented by way of example only, and that embodiments are not limited to the specific examples given. Various other types of symptom sets may be encountered for different types of assets, and recommendations for various other types of troubleshooting actions may be provided by a deep learning conversation model accordingly. Further, it should be appreciated that the order and number of steps used to arrive at a successful repair for an encountered symptom set may vary. Over time, for example, the deep learning conversational model may learn patterns of symptom sets and troubleshooting actions that may reduce the total number of steps needed to arrive at a successful repair for a given symptom set.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for encoding and decoding troubleshooting actions with machine learning to predict repair solutions will now be described in greater detail with reference to FIGS. 10 and 11. Although described in the context of system 100, these platforms may also be used to implement at least portions of other information processing systems in other embodiments.

Figure 10:
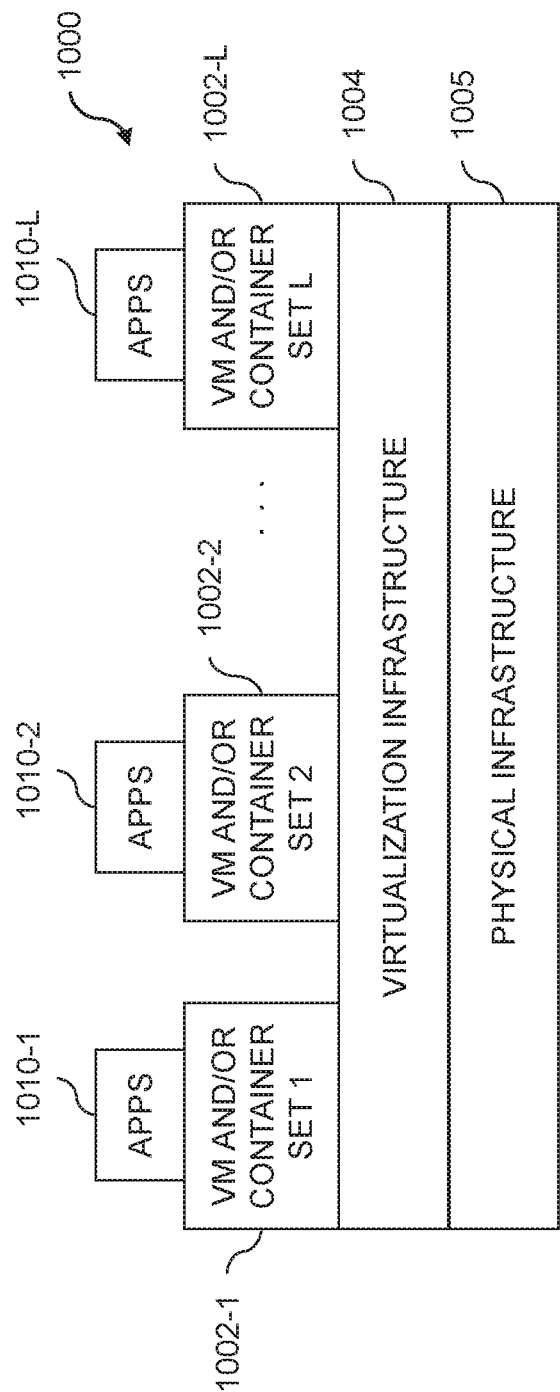
FIGS. 10 and 11 show examples of processing platforms that may be utilized to implement at least a portion of an information processing system in illustrative embodiments.
Figure 11:
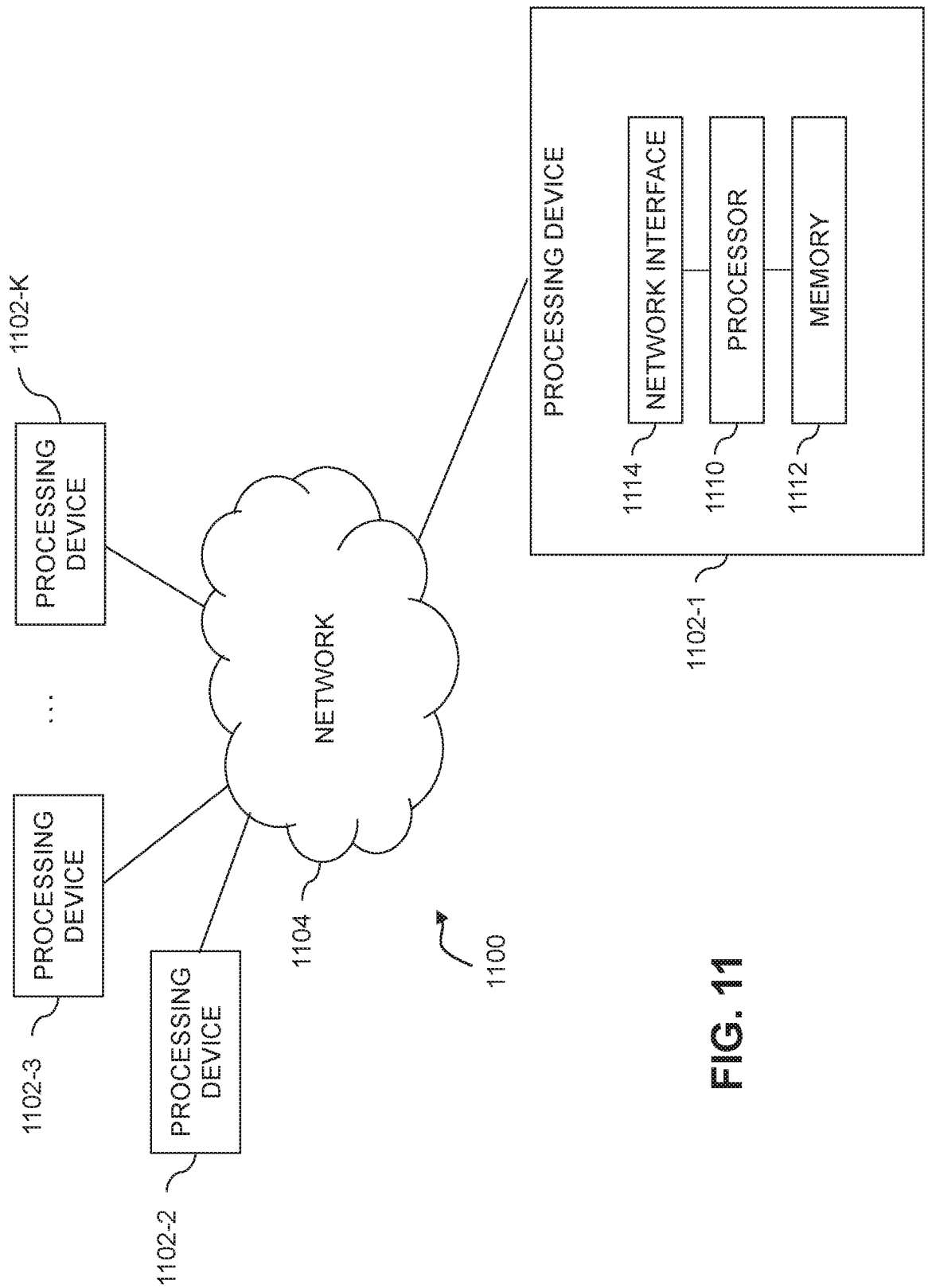

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for encoding and decoding troubleshooting actions with machine learning to predict repair solutions as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, symptom sets, diagnostic and repair actions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
    obtaining information regarding a given asset to be repaired;
    providing the information regarding the given asset to an encoder of a deep learning model;
    receiving, from a decoder of the deep learning model, a recommendation for a troubleshooting action to be performed on the given asset;
    performing the recommended troubleshooting action on the given asset;
    determining whether the recommended troubleshooting action results in a successful repair of the given asset;
    responsive to determining that the recommended troubleshooting action does not result in a successful repair of the given asset, augmenting the information regarding the given asset based at least in part on an output vocabulary of the decoder corresponding to the recommended troubleshooting action; and
    repeating the providing, receiving, performing and determining steps utilizing the augmented information regarding the given asset;
    wherein the method is performed by at least one processing device comprising a processor coupled to a memory.

2. The method of claim 1 wherein the information regarding the given asset to be repaired comprises one or more symptom sets, a given one of the one or more symptom sets comprising an identifier of the given asset, a description of the given asset, and a description of at least one error encountered on the given asset.

3. The method of claim 2, wherein the information regarding the given asset to be repaired further comprises result information regarding the success or failure of one or more troubleshooting actions previously performed on the given asset.

4. The method of claim 2 wherein the information regarding the given asset comprises two or more symptom sets, and wherein iterations of the providing, receiving, performing and determining steps are run separately for each of the two or more symptom sets by utilizing information corresponding to a single one of the two or more symptom sets in each iteration of the providing step.

5. The method of claim 1 wherein augmenting the information regarding the given asset based at least in part on the output vocabulary of the decoder corresponding to the recommended troubleshooting action comprises adding a negation of the output vocabulary of the decoder corresponding to the recommended troubleshooting action to the information regarding the given asset that is provided to the encoder of the deep learning model in a subsequent iteration of the providing step.

6. The method of claim 1 wherein the deep learning model comprises a sequence-to-sequence machine learning model.

7. The method of claim 6 wherein providing the information regarding the given asset to the encoder of the deep learning model comprises performing character-level input of the information regarding the given asset.

8. The method of claim 7 wherein augmenting the information regarding the given asset based at least in part on the output vocabulary of the decoder corresponding to the recommended troubleshooting action comprises modifying the character-level input of the information regarding the given asset to add a set of characters comprising a negation of the output vocabulary of the decoder corresponding to the recommended troubleshooting action.

9. The method of claim 6 wherein providing the information regarding the given asset to the encoder of the deep learning model comprises performing word-level input of the information regarding the given asset.

10. The method of claim 9 wherein augmenting the information regarding the given asset based at least in part on the output vocabulary of the decoder corresponding to the recommended troubleshooting action comprises modifying the word-level input of the information regarding the given asset to comprise negations of words in the output vocabulary of the decoder corresponding to the recommended troubleshooting action.

11. The method of claim 1 further comprising training the deep learning model utilizing information from one or more repair log entries for the given asset, historical repair logs for a plurality of other assets, and one or more technical support forums.

12. The method of claim 1 wherein the troubleshooting action comprises a diagnostic action.

13. The method of claim 1 wherein the troubleshooting action comprises a repair action.

14. The method of claim 13 wherein the given asset comprises a computing device, and wherein the repair action comprises modifying at least one of: one or more software components of the computing device; and one or more hardware components of the computing device.

15. A computer program product comprising a non-transitory processor-readable storage medium having stored therein program code of one or more software programs, wherein the program code when executed by at least one processing device causes the at least one processing device to perform steps of:
> obtaining information regarding a given asset to be repaired;
> providing the information regarding the given asset to an encoder of a deep learning model;
> receiving, from a decoder of the deep learning model, a recommendation for a troubleshooting action to be performed on the given asset;
> performing the recommended troubleshooting action on the given asset;
> determining whether the recommended troubleshooting action results in a successful repair of the given asset;
> responsive to determining that the recommended troubleshooting action does not result in a successful repair of the given asset, augmenting the information regarding the given asset based at least in part on an output vocabulary of the decoder corresponding to the recommended troubleshooting action; and
> repeating the providing, receiving, performing and determining steps utilizing the augmented information regarding the given asset.

16. The computer program product of claim 15 wherein the information regarding the given asset to be repaired comprises:
> one or more symptom sets, a given one of the one or more symptom sets comprising an identifier of the given asset, a description of the given asset, and a description of at least one error encountered on the given asset; and
> result information regarding the success or failure of one or more diagnostic and repair actions previously performed on the given asset.

17. The computer program product of claim 15 wherein augmenting the information regarding the given asset based at least in part on the output vocabulary of the decoder corresponding to the recommended troubleshooting action comprises adding a negation of the output vocabulary of the decoder corresponding to the recommended troubleshooting action to the information regarding the given asset that is provided to the encoder of the deep learning model in a subsequent iteration of the providing step.

18. An apparatus comprising:
> at least one processing device comprising a processor coupled to a memory;
> the at least one processing device being configured to perform steps of:
>> obtaining information regarding a given asset to be repaired;
>> providing the information regarding the given asset to an encoder of a deep learning model;
>> receiving, from a decoder of the deep learning model, a recommendation for a troubleshooting action to be performed on the given asset;
>> performing the recommended troubleshooting action on the given asset;
>> determining whether the recommended troubleshooting action results in a successful repair of the given asset;
>> responsive to determining that the recommended troubleshooting action does not result in a successful repair of the given asset, augmenting the information regarding the given asset based at least in part on an output vocabulary of the decoder corresponding to the recommended troubleshooting action; and
>> repeating the providing, receiving, performing and determining steps utilizing the augmented information regarding the given asset.

19. The apparatus of claim 18 wherein the information regarding the given asset to be repaired comprises:
> one or more symptom sets, a given one of the one or more symptom sets comprising an identifier of the given asset, a description of the given asset, and a description of at least one error encountered on the given asset; and
> result information regarding the success or failure of one or more diagnostic and repair actions previously performed on the given asset.

20. The apparatus of claim 18 wherein augmenting the information regarding the given asset based at least in part on the output vocabulary of the decoder corresponding to the recommended troubleshooting action comprises adding a negation of the output vocabulary of the decoder corresponding to the recommended troubleshooting action to the information regarding the given asset that is provided to the encoder of the deep learning model in a subsequent iteration of the providing step.

* * * * *